US009170146B2

(12) United States Patent
Gorenflo et al.

(10) Patent No.: US 9,170,146 B2
(45) Date of Patent: Oct. 27, 2015

(54) METHOD FOR FILL LEVEL MEASUREMENT ACCORDING TO THE TRAVEL TIME PRINCIPLE

(75) Inventors: Stefan Gorenflo, Hausen (DE); Alexey Malinovskiy, Maulburg (DE); Klaus Pankratz, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 101 days.

(21) Appl. No.: 13/604,084

(22) Filed: Sep. 5, 2012

(65) Prior Publication Data
US 2013/0063298 A1 Mar. 14, 2013

(30) Foreign Application Priority Data
Sep. 8, 2011 (DE) .......................... 10 2011 082 367

(51) Int. Cl.
*G01F 23/284* (2006.01)
*G01S 13/08* (2006.01)
*G01S 13/88* (2006.01)
*G01F 23/00* (2006.01)
*G01S 13/00* (2006.01)

(52) U.S. Cl.
CPC ................ *G01F 23/284* (2013.01); *G01S 13/08* (2013.01); *G01S 13/88* (2013.01)

(58) Field of Classification Search
CPC ....... G01F 23/22; G01F 23/28; G01F 23/282; G01F 23/284; G01S 13/02; G01S 13/06; G01S 13/08; G01S 13/88
USPC ............. 73/290 R, 290 V; 342/21, 22, 27, 28, 342/89–93, 118, 124, 159, 165, 173–175, 342/192–197
See application file for complete search history.

(56) References Cited

U.S. PATENT DOCUMENTS 5,438,867 A * 8/1995 van der Pol .................. 73/290 V
5,629,706 A * 5/1997 B.ang..ang.th ................ 342/124
(Continued)

FOREIGN PATENT DOCUMENTS

DE  42 33 324 C2  4/1994
DE  197 23 646 A1  12/1998
(Continued)

OTHER PUBLICATIONS

Peter Devine, "Radar Levels Measurement," VEGA Controls 2000, ISBN 0-9538920-0-X, pp. 288-289, Year 2000.
(Continued)

*Primary Examiner* — Bernarr Gregory
(74) *Attorney, Agent, or Firm* — Bacon & Thomas, PLLC

(57) ABSTRACT

A method for measuring a fill level of a fill substance in a container, in which, in an empty container, at least a part of the microwave signals transmitted into the container is reflected back via a reflection on a floor of the container. Microwave signals are transmitted into the container and their fractions reflected back to the fill-level measuring device. These are received as received signals. Echo functions are derived, which show amplitudes of the received signals as a function of a position corresponding to their travel time traveled in the container. A container floor echo is detected at a position, which lies in an earlier determined, both sides limited, empty echo position range, in which the container floor echo occurs in the case of empty container, at an empty echo position dependent on a shape of the container and an installed position of the fill-level measuring device.

10 Claims, 4 Drawing Sheets

(56) References Cited

U.S. PATENT DOCUMENTS

| | | | |
|---|---|---|---|
| 5,969,666 A * | 10/1999 | Burger et al. | 342/124 |
| 6,681,626 B2 * | 1/2004 | Funfgeld | 73/290 V |
| 6,701,783 B2 * | 3/2004 | Fehrenbach et al. | 73/290 V |
| 6,795,015 B2 * | 9/2004 | Edvardsson | 342/124 |
| 7,046,189 B2 * | 5/2006 | Spanke et al. | 342/124 |
| 7,345,622 B2 * | 3/2008 | Edvardsson | 342/124 |
| 7,532,155 B2 * | 5/2009 | Kleman et al. | 342/124 |
| 7,541,969 B2 * | 6/2009 | .Ang.kerstrom et al. | 342/124 |
| 7,889,120 B2 * | 2/2011 | Flasza | 342/124 |
| 7,924,216 B2 * | 4/2011 | Delin | 342/124 |
| 8,020,438 B2 * | 9/2011 | Miskell et al. | 342/124 |
| 8,098,193 B2 * | 1/2012 | Sai et al. | 342/124 |
| 8,159,386 B2 * | 4/2012 | Malinovskiy et al. | 342/124 |
| 8,319,680 B2 * | 11/2012 | Sai | 342/124 |
| 8,350,752 B2 * | 1/2013 | Hemmendorff | 342/124 |
| 8,567,243 B2 * | 10/2013 | Malinovskiy et al. | 342/124 |
| 2008/0060431 A1 * | 3/2008 | Frovik | 73/290 V |

FOREIGN PATENT DOCUMENTS

| | | |
|---|---|---|
| DE | 101 06 176 A1 | 8/2002 |
| EP | 1 039 273 B1 | 11/2007 |
| WO | 03/016835 A1 | 2/2003 |

OTHER PUBLICATIONS

German Search Report in 10 2011 082 367.0, dated Apr. 10, 2012.

* cited by examiner

METHOD FOR FILL LEVEL MEASUREMENT ACCORDING TO THE TRAVEL TIME PRINCIPLE

TECHNICAL FIELD

The invention relates to a method for measuring a fill level of a fill substance in a container with a fill-level measuring device working according to the travel time principle in measuring arrangements, in which, in the case of an empty container, at least a part of the microwave signals transmitted into the container is reflected back to the fill-level measuring device via a reflection on a floor of the container, wherein the fill-level measuring device transmits microwave signals into the container and receives back as received signals their fractions reflected back in the container to the fill-level measuring device after a travel time dependent on their path distance traveled in the container, based on the received signals echo functions are derived, which show amplitudes of the received signals as a function of a position corresponding to their travel time or their path distance traveled in the container, and, based on the echo functions, it is detected whether these contain a fill-level echo attributable to a reflection on the surface of the fill substance, and whether these contain a container floor echo attributable to a reflection on the container floor.

BACKGROUND DISCUSSION

Such fill-level measuring methods are applied in a large number of branches of industry, e.g. in the processing industry, in the chemicals industry or in the foods industry.

Typically, the fill-level measuring device is mounted above the container. In measurement operation, microwave signals are transmitted from the fill-level measuring device toward the fill substance in the container, and their fractions reflected back in the container to the fill-level measuring device are received back as received signals after a travel time dependent on their path distance traveled in the container. Based on the received signals, echo functions are derived, which show amplitudes of the received signals as a function of a position corresponding to their travel time or their path distance traveled in the container. In such case, travel time and path distance are convertable into one another based on the propagation velocity of the microwave signals along the path.

Reflections on reflectors located in the container, reflectors such as e.g. the surface of the fill substance and the container floor, bring about local maxima in the echo functions, referred to herein subsequently as echoes, at a position in the echo function corresponding to their distances from the fill-level measuring device.

For determining the travel times, all known methods can be applied, which enable relatively short distances to be measured by means of reflected microwaves. The most well known examples are the pulse radar method and the frequency modulation, continuous wave radar method (FMCW radar).

In the case of pulse radar, short microwave transmission pulses are transmitted periodically into the container, where they are reflected and, after a travel time dependent on the path distance traveled by them, received back.

In the case of the FMCW-method, a microwave signal is continuously transmitted, which is periodically linearly frequency modulated, for example, in the manner of a sawtooth function. The frequency of the received signal consequently has, relative to the instantaneous frequency, which the transmission signal has at the point in time of receipt, a frequency difference, which depends on the travel time of the associated microwave signal. The frequency difference between transmission signal and received signal, which can be won by mixing both signals and evaluating the Fourier spectrum of the mixed signal, corresponds, thus, to the travel time and therewith to the separation of the reflecting surface from the fill-level measuring device. Furthermore, the amplitudes of the spectral lines of the frequency spectrum won from the Fourier transformation correspond to the echo amplitudes. This Fourier spectrum consequently represents the echo function in this case.

Based on the echo function, a fill-level echo is determined, which corresponds to the reflection of the transmitted signal on the surface of the fill substance. From the travel time of the fill-level echo, there results directly, in the case of known propagation velocity of the microwaves, the path distance, which the microwaves traveled on their path from the measuring device to the surface of the fill substance and back. Based on the installed height of the fill-level measuring device over the container, the sought fill level can be directly calculated therefrom, In such case, it is desired also to be able to detect the presence of an empty container correctly and reliably. In the case of empty container, there is no reflection of the microwave signals on the surface of the fill substance. Instead, the microwave signals strike, at a distance from the fill-level measuring device subsequently referenced herein as the empty distance, a portion of the container floor, and are reflected there. In measurement applications, in which, in the case of empty container, at least a part of microwave signals transmitted into the container is reflected back via a container floor to the fill-level measuring device, the echo functions have in the case of empty container regularly an echo designated subsequently herein as the container floor echo, which is attributable to the reflection on the container floor.

Problematic, in such case, is that the position of the container floor echo in the echo function in the case of empty container is dependent on the location of installation of the fill-level measuring device and on the geometry of the container. Only in the case of empty container with flat floor are the transmitted microwave signals reflected directly back to the fill-level measuring device. In that case, the container floor echo occurs in the case of empty container at the position within the echo function corresponding to the empty distance.

If, in contrast, the transmitted microwave signals fall in the case of empty container, for example, on an inclined or curved portion of the container floor, then they are reflected corresponding to their angle of incidence, with which they strike the portion, and can, thus, only indirectly be reflected back to the fill-level measuring device via other reflections in the container. Here, in the case of empty container, the fractions of the transmission signals reflected back in the container to the fill-level measuring device travel a path dependent on the location of installation and dependent on the container geometry. The length of this path can, in given cases, be very much greater than the empty distance.

In order to detect an empty container, presently there are already methods applied, in the case of which, based on the echo functions, it is checked, first of all, whether a fill-level echo can be identified within the empty distance. If such is not the case, then, it is checked whether a container floor echo has occurred in a region of the echo functions exceeding the empty distance. Since the container floor echo, depending on container form, can also occur at positions, which are clearly greater than the empty distance, there is, for this, regularly taken into consideration a relatively large range of distances, which range begins at the position corresponding to the empty distance and contains those positions corresponding to distances to the fill-level measuring device, which are greater than the empty distance. If there is in this range of distances a corresponding echo, it is recognized as the container floor echo, and the fill-level measuring device reports an empty container.

This method contains, however, the danger of incorrect empty reports, when a fill-level echo of an actually present fill substance is temporarily not detectable. In that case, due to a container floor echo present in the echo function supplementally to the not detectable fill-level echo, an empty container is indicated.

This case arises, for example, when the fill substance has temporarily a smaller dielectric constant, and, thus, only weak reflections occur on the surface of the fill substance. These weak reflections are not unequivocally identifiable in the echo function due to their small amplitude. Likewise, also turbulence on the surface of the fill substance or foam formation on the surface can lead to the result that the fill-level echo can no longer be identified in the echo function.

Moreover, the fill-level echo can also no longer be directly identified, when the fill level in the container runs over a height, in which a microwave reflecting disturbance, such as e.g. a component installed in a container, such as a stirrer, is located. If the fill level is located at the height of the disturbance, then disturbance echo and fill-level echo superimpose in the same region of the echo function and, accordingly, one cannot be directly distinguished from the another. This problem is, however, today overcomeable by supplemental measures, such as e.g. suitable echo tracking algorithms.

SUMMARY OF THE INVENTION

It is an object of the invention to provide a method for fill level measurement with a microwave fill-level measuring device working according to the travel time principle and safely and reliably recognizing the presence of an empty container.

For this, the invention resides in a method for measuring a fill level of a fill substance in a container with a fill-level measuring device working according to the travel time principle in measuring arrangements, in which, in the case of an empty container, at least a part of the microwave signals transmitted into the container is reflected back to the fill-level measuring device via a reflection on a floor of the container, wherein:
the fill-level measuring device transmits microwave signals into the container and receives back as received signals their fractions reflected in the container to the fill-level measuring device after a travel time dependent on their path distance traveled in the container,
based on the received signals, echo functions are derived, which show amplitudes of the received signals as a function of a position corresponding to their travel time or their path distance traveled in the container,
based on the echo functions, it is detected whether these contain a fill-level echo attributable to a reflection on a surface of the fill substance and whether these contain a container floor echo attributable to a reflection on a container floor, and
presence of an empty container is indicated only when, in the respective echo function, no fill-level echo was detected, and, in the respective echo function, a container floor echo was detected at a container floor echo position, which lies in an earlier determined, both sides limited, empty echo position range, in which the container floor echo occurs in the case of empty container, at an empty echo position dependent on a shape of the container and an installed position of the fill-level measuring device.

A first further development of the invention concerns a method, in the case of which the empty echo position is determined by steps including that:
the fill-level measuring device, over a period of time, in which the container is emptied at least once, transmits microwave signals into the container and receives back as received signals their fractions reflected back in the container to the fill-level measuring device after a travel time dependent on their path distance traveled in the container,
based on the received signals, echo functions are derived, which show amplitudes of the received signals as a function of a position corresponding to their travel time or their path distance traveled in the container,
based on the echo functions, container floor echo positions of the container floor echoes detectable in the echo functions are determined, and
the empty echo position is set equal to the least container floor echo position determined in this period of time, when within the period of time at least one container floor echo was detected.

A further development of the first further development concerns a method, wherein:
an empty distance position range surrounding an empty distance position is predetermined, in which therein occurring echoes are identifiable neither as fill-level echoes nor as container floor echoes,
wherein the empty distance position is that position, which corresponds to a distance from the fill-level measuring device, in which the microwave signals transmitted from the fill-level measuring device in the case of empty container first strike a portion of the container floor,
the empty echo position range is set equal to the empty distance position range, when, during the period of time, no container floor echo was detected or the least container floor echo position arisen during the period of time borders directly on the empty distance position range,
the empty echo position range is set equal to an empty echo position surrounding range, whose width is greater than a position determination accuracy of the fill-level measuring device and less than a single digit multiple of the position determination accuracy, when the ascertained empty echo position exceeds the empty distance position range by more than the position determination accuracy, and,
in subsequent regular measurement operation, echoes occurring within the empty echo position range are identified as container floor echoes.

Another further development of the first further development concerns a method, in the case of which the fill substance partially reflects microwave signals striking thereon and partially lets them pass through, and container floor echo positions in the echo functions are determined by:
detecting a container floor echo in one of the echo functions derived during the period of time and determining its container floor echo position, and
detecting the container floor echoes of the echo functions derived timewise after this echo function, in each case, based on the respective echo function and the earlier last determined container floor echo position.

A second further development of the invention concerns a method, in the case of which the fill substance partially reflects microwave signals striking thereon and partially lets them pass through, and the empty echo position is determined by steps including that:

the fill-level measuring device, over a period of time, in which the fill level varies at least by a predetermined minimum amount and the container is emptied at least once, transmits microwave signals into the container and receives back as received signals their fractions reflected back in the container to the fill-level measuring device after a travel time dependent on their path distance traveled in the container, based on the received signals, echo functions are derived, which show amplitudes of the received signals as a function of a position corresponding to their travel time or their path distance traveled in the container, based on the echo functions, fill level echo positions of the fill-level echoes detectable in the echo functions and container floor echo positions of the container floor echoes detectable in the echo functions are determined and stored together with the, in each case, associated fill levels, the greatest fill level echo position detected during the period of time is determined, and the associated fill level kept as the lowest fill level arisen during the period of time, and, based on the recorded container floor echo positions and the associated fill levels, a first regression line is determined, which shows the positions of the container floor echoes as a function of fill level, and the empty echo position is determined as that container floor echo position, which is present according to the regression line at the lowest arisen fill level.

A further development of the second further development concerns a method, wherein:

at the beginning of the period of time, an empty distance position range surrounding an empty distance position is predetermined, in which therein occurring echoes are identifiable neither as fill-level echoes nor as container floor echoes, wherein an empty distance is a distance from the fill-level measuring device dependent on the installed height of the fill-level measuring device and the container form, in which distance microwave signals transmitted from the fill-level measuring device, in the case of empty container, first strike a portion of the container floor, and the empty distance position is the position within the echo functions corresponding to the empty distance, based on the recorded fill level echo positions and the associated fill levels, a second regression line is determined, which shows the positions of the fill-level echoes as a function of fill level, a fictive empty distance position is determined, which is equal to the position of an intersection of the two regression lines, echoes arisen within the period of time in the echo functions and also within the empty distance range are identified as fill-level echoes, when they occur at a position, which is less than the fictive empty distance position, and are identified as container floor echoes, when they occur at a position, which is greater than the fictive empty distance position.

A further development of the latter further development concerns a method, in the case of which, based on the greatest detected fill level echo position, an actually present empty distance and/or its actually present empty distance position are determined by setting the actually present empty distance position equal to the greatest fill level echo position detected in the period of time.

A third further development of the invention concerns a method, in the case of which the fill substance partially reflects microwave signals striking thereon and partially lets them pass through, and the fill level is determined based on an earlier ascertained dependence of the container floor echo positions on the fill level and the position of the floor echo, when:

no fill-level echo was detected in the echo function, and
the floor echo position of the detected floor echo lies outside of the empty echo position range.

A further development of the latter further development concerns a method, in the case of which the dependence of the container floor echo position on fill level is predetermined by steps including that the fill-level measuring device, over a period of time, in which the fill level varies by at least a predetermined minimum amount, transmits microwave signals into the container and receives back as received signals their fractions reflected back in the container to the fill-level measuring device after a travel time dependent on their path distance traveled in the container, based on the received signals, echo functions are derived, which show amplitudes of the received signals as a function of a position corresponding to their travel time or their path distance traveled in the container, based on the echo functions, container floor echo positions of the container floor echoes detectable in the echo functions are determined and stored together with the, in each case, associated fill levels, and based on the recorded container floor echo positions and the associated fill levels, a regression line is determined, which shows dependence of the container floor echo position on fill level.

A further development of the first further development, the second further development, the further development of the second further development, the third further development, or the further development of the third further development, provides that, during the period of time, in which, based on the echo functions recorded in the respective period of time, the empty distance position and/or the dependence of the container floor echo position on fill level is determined, fill level is measured by determining in the echo functions the fill level echo positions of the fill-level echoes detectable in the echo functions, and the associated fill levels are determined based on the fill level echo positions.

BRIEF DESCRIPTION OF THE DRAWINGS

The invention and its advantages will now be explained in greater detail based on the figures of the drawing, in which three examples of embodiments are presented; equal parts are provided in the figures with equal reference characters. The figures of the drawing show as follows.

DETAILED DISCUSSION IN CONJUNCTION WITH THE DRAWINGS

Figure 1:
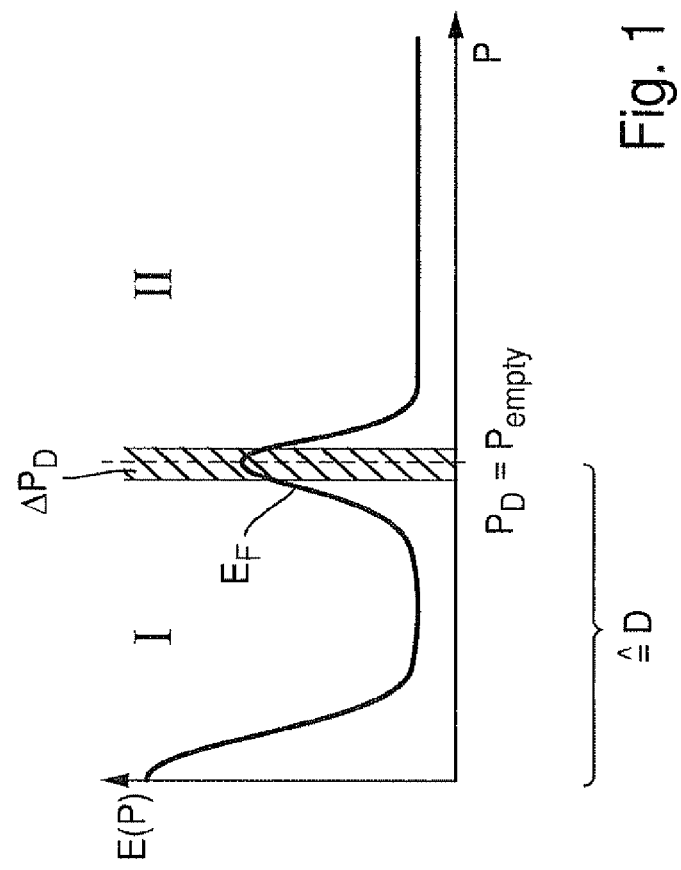
FIG. 1 is a fill level measuring arrangement with a container with flat container floor, together with an echo function derived in this arrangement in the case of empty container.
Figure 1:
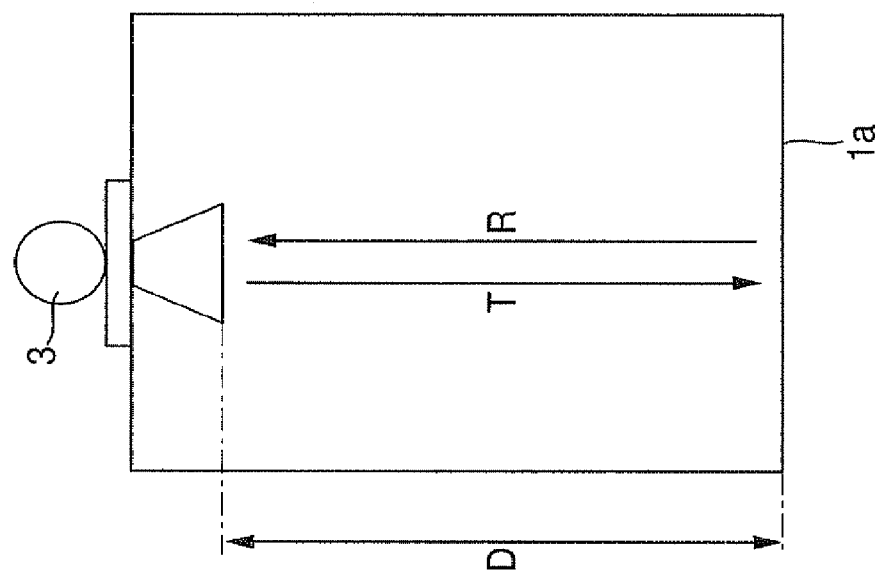

The method of the invention for fill level measurement of a fill substance in a container 1 will now be described, by way of example, based on three fill level measuring arrangements illustrated in FIGS. 1 to 3. Each figure shows a measuring arrangement with a fill-level measuring device 3 arranged on an empty container 1, thus, the container 1a in FIG. 1, the container 1b in FIG. 2 and the container 1c in FIG. 3. In all three measuring arrangements, an empty distance D is indicated. Empty distance D is the separation, as predetermined by the location of installation of the fill-level measuring device 3 and the container form, lying between the fill-level measuring device 3 and the respective region of the container floor, on which microwave signals T transmitted from the fill-level measuring device 3 first strike in the case of empty container 1.

The method of the invention is applicable in connection with the initially named fill-level measuring devices 3 working according to the travel time principle, such as e.g. pulse radar, fill-level measuring devices, and it is also applicable in connection with FMCW radar, fill-level measuring devices.

In such case, the fill-level measuring device 3, in measurement operation, transmits microwave signals T into the container 1. The microwave signals T are reflected in the container 1, especially on the surface of the fill substance and/or on a container floor, and their fractions reflected back to the fill-level measuring device 3 are received back as received signals R after a travel time dependent on their path distance traveled in the container 1.

Based on the received signals R, echo functions E(P) are derived, which show amplitudes of the received signals R as a function of their position P. The position P corresponds, in such case, either to the travel time associated with the respective amplitude, as measured by the fill-level measuring device 3 and required by the reflected portions for the path distance from the fill-level measuring device 3 to the reflection location and back, or to the path distances traveled in the container 1 and corresponding to the respective travel time.

For deriving the echo functions E(P), all known methods applied in fill-level measuring devices of this type can be applied. In such case, as a rule, an echo function E(P) is derived for each of the signals R as they are received, one after the other.

Then, based on the echo functions E(P), it is determined whether these contain a fill-level echo $E_L$ attributable to a reflection on the surface of the fill substance, and whether these contain a container floor echo $E_F$ attributable to a reflection on the container floor.

Application of the method of the invention assumes that, in the case of empty container 1, at least a part of the transmitted microwave signals T is reflected back to the fill-level measuring device 3 via a reflection on the container floor. If, due to the geometry and/or the manner of installation of the fill-level measuring device 3, this is basically not possible in the case of empty container 1, then the method of the invention is not applicable.

For detecting the fill-level echo $E_L$ and the container floor echo $E_F$, the respective echo function E(P) is preferably stored in the fill-level measuring device 3 in digital form, and examined by means of corresponding echo recognition algorithms known from fill level measuring technology. The echo recognition methods based on these echo recognition algorithms operate regularly on the concept that reflections on reflectors located in the container 1, especially on the surface of the fill substance and on the container floor, show up in the echo functions E(P) in the form of local maxima. Each maximum of the echo function corresponds to an echo attributable to a reflection on a reflector. The position P of the respective echo corresponds to the associated signal travel time to the reflector and back and therewith the path distance traveled in the container 1.

Correspondingly, for example, first of all, position and amplitude of the maxima of the respective echo function E(P) are determined, and, based on supplemental criteria predetermined by the applied method, it is detected whether one of the ascertained echoes is a fill-level echo $E_L$, and whether one of the echoes is a container floor echo $E_F$.

In such case, the echo function E(P) is regularly divided into two regions based on an empty distance position $P_D$ corresponding to the empty distance D; namely, into a first region I, which includes all positions P, which correspond to distances from the fill-level measuring device 3, which are less than the empty distance D, and a second region II, which includes the positions, which correspond to distances from the fill-level measuring device, which are greater than the empty distance D.

The empty distance D is, as a rule, at least approximately known, and is input to the fill-level measuring device 3 e.g. in the case of its start-up at the location of use. If the empty distance D is known only within a measurement accuracy or tolerance, then also the associated empty distance position $P_D$ can only be determined with a corresponding inaccuracy. In that case, the two regions I, II are separated from one another by an empty distance position range $\Delta P_D$, which includes the actually present empty distance position $P_D$, and its width corresponds to the inaccuracy of the empty distance position $P_D$. In such case, the measurement accuracy of the empty distance D amounts frequently to a number of centimeters, and is therewith clearly greater than the positional resolution of today's fill level measuring devices 3.

For identification of a fill-level echo $E_L$ possibly present in the echo function E(P), today, for example, echo recognition methods are applied, in the case of which it is assumed that the fill-level echo $E_L$ has a larger amplitude than the remaining echoes detected in the first region I. Correspondingly, here, the echo within the first region I with the greatest amplitude is detected as the fill-level echo $E_L$. Along with that, echo recognition methods are known, in the case of which it is assumed that the fill-level echo $E_L$ is the first echo occurring in the first region I. Correspondingly, here, the first echo is identified as the fill-level echo $E_L$. Moreover, it is also possible to combine the two methods with one another by defining e.g. a so -called first echo factor. The first echo factor is a predetermined factor, by which an echo must exceed a certain amplitude, in order to be recognized as fill-level echo $E_L$. Additionally, preferably, an, in given cases, also positionally dependent, predetermined, echo threshold can be defined, which the amplitude of an echo must exceed, in order to be recognized as fill-level echo $E_L$. In this way, disturbance signals of lesser amplitude initially can be suppressed, and, for example, also disturbing echoes, such as those caused e.g. by components installed in a container at known height, can be masked out. If no echo fulfilling these criteria is located in the first region I, then no fill-level echo $E_L$ is detectable.

This echo method can, in analogous manner, also be taken into consideration for detecting the container floor echo $E_F$ in the second region II, by, for example, recognizing the first echo occurring in the second region II, or the echo occurring in the second region II with the greatest amplitude, as container floor echo $E_F$. If there is located in the second region II no echo fulfilling these criteria, then no container floor echo $E_F$ is detectable.

If the two regions I, II are separated from one another by an empty distance position range $\Delta P_D$, then echoes occurring within this empty distance position range $\Delta P_D$ can neither be unequivocally identified as fill-level echo $E_L$ nor unequivocally identified as container floor echo $E_F$.

According to the invention, an empty container 1 is displayed only when, in the respective echo function E(P), no fill-level echo $E_L$ could be detected, and a container floor echo $E_F$ was detected at a position PF within the echo function E(P), which lies in an earlier determined, empty echo position range $\Delta P_{empty}$. The empty echo position range $\Delta P_{empty}$ is a range limited on both sides of an empty echo position $P_{empty}$, in which the container floor echo $E_F$ occurs in the echo function E(P) in the case of empty container 1.

The empty echo position $P_{empty}$ corresponds to the path distance of the microwave signals traveled in the container 1 in the case of empty container 1. It depends on the container form and on the installed position of the fill-level measuring device 3 on the respective container 1, and can clearly be greater than the empty distance position $P_D$.

Figure 2:
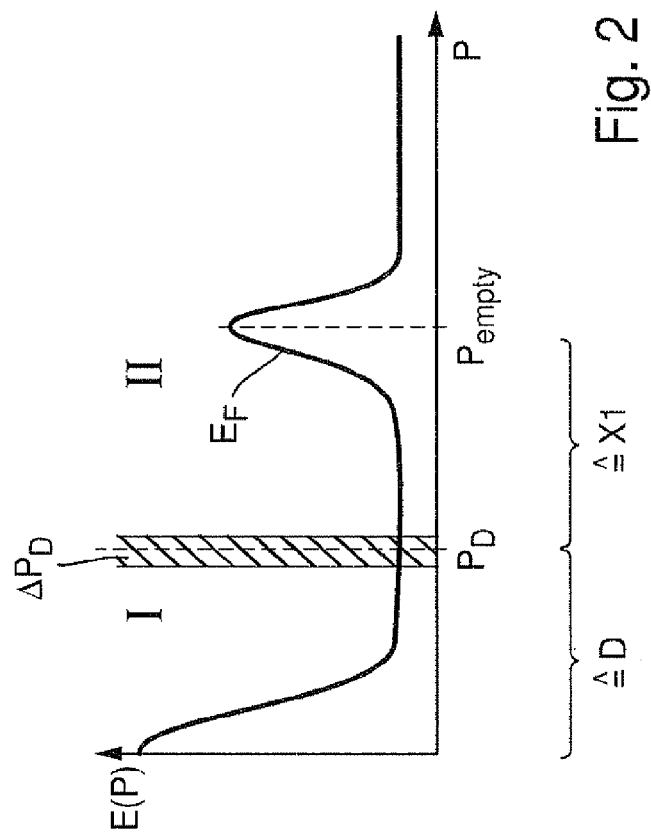
FIG. 2 is a fill level measuring arrangement with a reclining cylindrical container, together with an echo function derived in this arrangement in the case of empty container.
Figure 2:
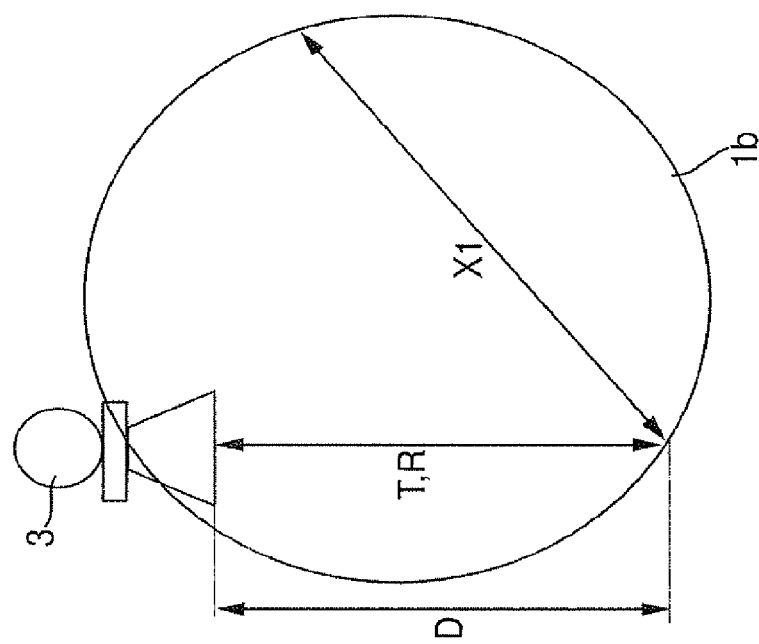
Figure 3:
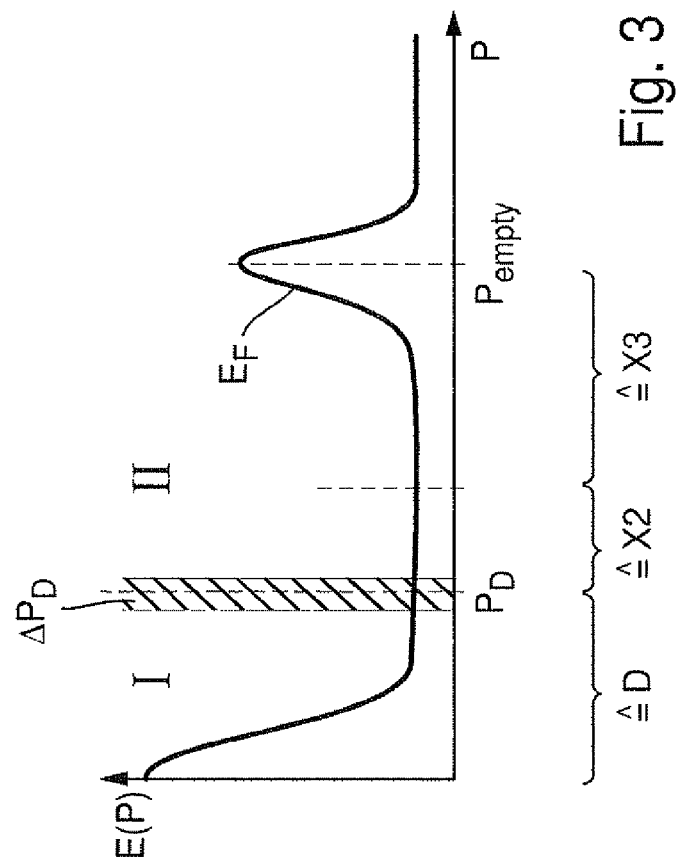
FIG. 3 is a fill level measuring arrangement with a container with funnel shaped container floor, together with an echo function derived in this arrangement in the case of empty container.
Figure 3:
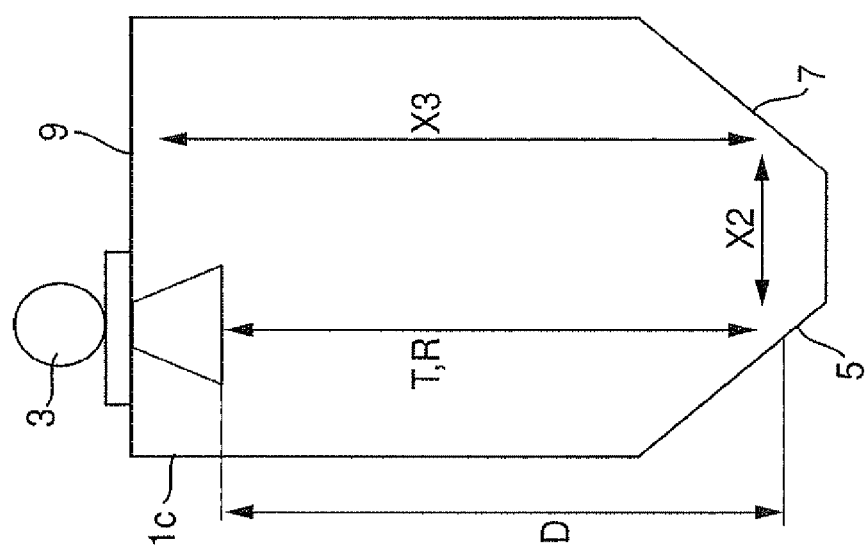

For illustration of this, to the right beside the measuring arrangements of FIGS. 1 to 3 are shown the respective echo functions E(P) derived for the respective measuring arrangements in the case of empty container 1a, 1b, 1c.

The container 1a shown in the measuring arrangement of FIG. 1 is an upright cylindrical tank with a flat floor. In this case of empty container 1a, microwave signals T striking the planar container floor are reflected directly back to the fill-level measuring device 3. Correspondingly, the container floor echo $E_F$ in the case of empty container 1a occurs in the associated echo function E(P) at an empty echo position $P_{empty}$, which is equal to the empty distance position $P_D$.

The container 1b shown in the measuring arrangement of FIG. 2 is a reclining cylindrical tank. Here, the microwave signals T, at the distance from the fill-level measuring device 3 given by the empty distance D, first striking the curved container floor, are reflected to an oppositely lying, likewise curved, inner wall of the container 1b, from where they are reflected via the curved container floor back to the fill-level measuring device 3. Correspondingly, the container floor echo $E_F$ in the case of empty container 1b shows up in the echo function E(P) here later at an empty echo position $P_{empty}$, which corresponds to the sum of the empty distance D and the additional path distance X1 traveled in the container 1b between the container floor and the oppositely lying, inner wall.

The container 1c shown in the measuring arrangement of FIG. 3 is a tank with a funnel shaped floor. In this example, the microwave signals T, at the separation given by the empty distance D, strike inclined funnel inner surface 5 and from there are reflected to an oppositely lying, likewise inclined, funnel inner surface 7. The latter reflects the thereon striking microwave signals to a container lid 9, from where they, in turn, via reflections on the two oppositely lying, funnel inner surfaces 7, 5 are reflected back to the fill-level measuring device 3. Correspondingly, the container floor echo $E_F$ in the case of empty container 1c occurs in the echo function E(P) here later an empty echo position $P_{empty}$, which corresponds to the sum of the empty distance D, the path distance X2 traveled between the funnel inner surfaces 5, 7 and the path distance X3 traveled between the second funnel inner surface 7 and the container lid 9.

If the installed position of the fill-level measuring device 3 and the geometry of the container 1 for a measuring arrangement, in which the method of the invention is to be applied, are known earlier exactly, the empty echo position range $\Delta P_{empty}$ can be calculated earlier based on the propagation velocity of the microwave signals T in the fill substance medium located in the container 1 in the respective application.

Preferably, the empty echo position range $\Delta P_{empty}$ is, however, determined by the fill-level measuring device 3 in a preferably automated method running automatically at the location of use in the respective measuring arrangement. This offers the advantage that the empty echo position range $\Delta P_{empty}$ can also be determined when earlier no or only rudimentary information concerning the container form and the installed position of the fill-level measuring device 3 on the respective container 3 are known. A further advantage is that the empty echo position range $\Delta P_{empty}$, in such case, is derived based on the actual conditions at the location of use. In this way, registered and taken into consideration in its derivation are, besides the container form and the installed position, automatically also other application-specific circumstances that influence the propagation of the microwave signals in the container 1. These include, especially, objects installed in the container 1 and influencing the beam path of the microwave signals in the case of empty container 1, objects such as e.g. other measuring devices or stirring mechanisms.

In this connection, the fill-level measuring device 3 is installed at the location of use and placed for a period of time, in which the container 1 is emptied at least once, in a learning mode of operation. This learning mode of operation corresponds essentially to regular fill level measurement operation. I.e., the fill-level measuring device transmits microwave signals T into the container 1 and receives as received signals R their fractions reflected back in the container 1 to the fill-level measuring device 3 after a dependent travel time on their path distance traveled in the container 1. Also here, based on the received signals R, echo functions E(P) are formed, which show amplitudes of the received signals R as a function of the position P corresponding to their travel time or their path distance traveled in the container 1.

The echo functions E(P) derived during this period of time are examined as to whether they have a detectable container floor echo $E_F$, and the container floor echo positions PF of the container floor echoes $E_F$ detected in the echo functions E(P) are determined and registered. This is done, for example, in the above described manner.

Since the container 1 is emptied at least once during the period of time, it is assured independently of the reflection characteristics of the fill substance that at least once, namely while the container 1 is empty, a container floor echo $E_F$ occurs. If the container floor echo $E_F$ occurring in the case of empty container 1 lies, due to the conditions of the fill level measuring arrangement, within the range II of the echo function E(P) lying above the empty distance $P_D$, or above the empty distance range $\Delta P_D$, it is detected by the fill-level measuring device 3 as a container floor echo $E_F$. The container floor echo $E_F$ arisen in the case of empty container 1 is only not detected by the fill-level measuring device 3 as a container floor echo $E_F$, when it lies within the empty distance range $\Delta P_D$.

In the case of fill substances with lesser dielectric constant and accordingly lesser reflectivity, besides the container floor echo $E_F$ arising in the case of empty container 1, naturally also container floor echoes $E_F$ are detected, when the fill level L rises above the fill level corresponding to the empty distance D. In that case, only a part of the microwave signals T is reflected on the fill substance upper surface back to the fill-level measuring device 3. The remaining, not reflected part penetrates the fill substance down to the container floor, from where at least a part of the penetrating portion is reflected back to the fill-level measuring device 3 via a path dependent on the container geometry. Since the propagation velocity of microwave signals in the fill substance is less than in the medium located thereabove, which is, as a rule, air, the container floor echos $E_F$, which were detected in the case of a fill level L located above the empty distance D, occur later, i.e. at greater positions PF, than the one or more container floor echoes $E_F$ detected in the case of empty container 1.

If, during the period of time, at least one container floor echo $E_F$ is detected, the empty echo position $P_{empty}$ is accordingly set equal to the least container floor echo position PF determined in the period of time.

Following the determining of the empty echo position $P_{empty}$, preferably a empty echo position range $\Delta P_{empty}$, narrowly limited on both sides around this empty echo position $P_{empty}$ is established, in which the container floor echo $E_F$ is to be expected in subsequent measurement operation in the case of empty container 1. In such case, the empty echo position range $\Delta P_{empty}$ must be at least as great as the accuracy of measurement of the position determination.

If the ascertained empty echo position $P_{empty}$ exceeds the empty distance position range $\Delta P_D$ by more than the position determination accuracy of the fill-level measuring device 3, then preferably an empty echo position range $\Delta P_{empty}$ surrounding the ascertained empty echo position $P_{empty}$ is selected, whose width is greater than the position determination accuracy and less than a single digit multiple of the position determination accuracy of the fill-level measuring device (3). If the ascertained empty echo position $P_{empty}$, in contrast, borders directly on the empty distance position range $\Delta P_D$, then the empty echo position range $\Delta P_{empty}$ is set equal to the empty distance position range $\Delta P_D$.

If, during the period of time, no container floor echo $E_F$ is detected, then it follows that the empty echo position $P_{empty}$ is located within the empty distance position range $\Delta P_D$. Also in this case, the sought empty echo position range $\Delta P_{empty}$ is set equal to the empty distance position range $\Delta P_D$.

In the following regular measurement operation, echoes occurring within the empty echo position range $\Delta P_{empty}$ are accordingly also identified as container floor echoes $E_F$, when they occur within the empty distance position range $\Delta P_D$.

For determining the empty echo position range $\Delta P_{empty}$, at the beginning of the period of time, a very large position range of the second range II of the echo functions E(P) must be registered and examined for container floor echoes $E_F$. As soon as a first container floor echo $E_F$ is detected during the period of time, then the position range to be evaluated can be successively reduced by bordering it above, in each case, by the least container floor echo position PF yet determined in the period of time.

For detecting the container floor echo $E_F$ in connection with fill substances, which partially reflect and partially pass microwave signals striking thereon, support methods can be applied, which are referred to in the fill level measuring technology under the name 'echo tracking', as regularly applied in such technology for detecting fill-level echoes. These methods are based on the concept that an echo attributable to a certain reflector, e.g. the surface of the fill substance, in the container 1 can change its position only with a rate of change upwardly limited by the maximum velocity, with which the fill level can change in the particular application. Accordingly, the time development of the position of a once identified echo can be tracked. In such case, there results, due to the position of this echo ascertained in the, in each case, preceding measuring cycle and the application-specific maximum rate of change of the position of this echo, a limited range within the current echo function E(P), within which the new position P of this echo must be located. Correspondingly, for example, the position P of an absolute maximum of the current echo function E(P) is ascertained in this limited range and defined as the new position of this echo.

Correspondingly here, for determining the empty echo position $P_{empty}$, the container floor position PF of a first detected container floor echo $E_F$ in one of the echo functions E(P) derived during the period of time can be determined, and its time development subsequently tracked by detected the container floor echo positions PF of the container floor echoes $E_F$ present in the subsequently recorded echo functions E(P), in each case, based on the respective echo function E(P), the application-specific maximal rate of change of the container floor echo position PF and the earlier last determined, container floor echo position PF.

In parallel therewith, the echo functions E(P) derived during the period of time can also be examined for a fill-level echo $E_L$ and the fill level L determined and output based on the fill level echo positions PL of the detected fill-level echoes $E_L$. Therewith, the fill-level measuring device 3 is already applicable during the learning mode of operation for fill level measurement.

In connection with fill substances, which partially reflect and partially pass microwave signals striking thereon, alternatively to the above described empty echo position determination method, also the subsequently described method can be applied. In such case, the fill-level measuring device 3 derives echo functions E(P) in the above described manner over a period of time, in which the fill level L moves through a fill level range AL and the container 1 is empty at least once, and the fill level echo positions PL of the therein detectable fill-level echoes $E_L$ and the container floor echo positions PF of the therein detectable container floor echoes $E_F$ are determined and stored together with the, in each case, associated fill levels L. The associated fill levels L can also here already be ascertained based on the fill level echo positions PL of the detected fill-level echoes $E_L$.

Figure 4:
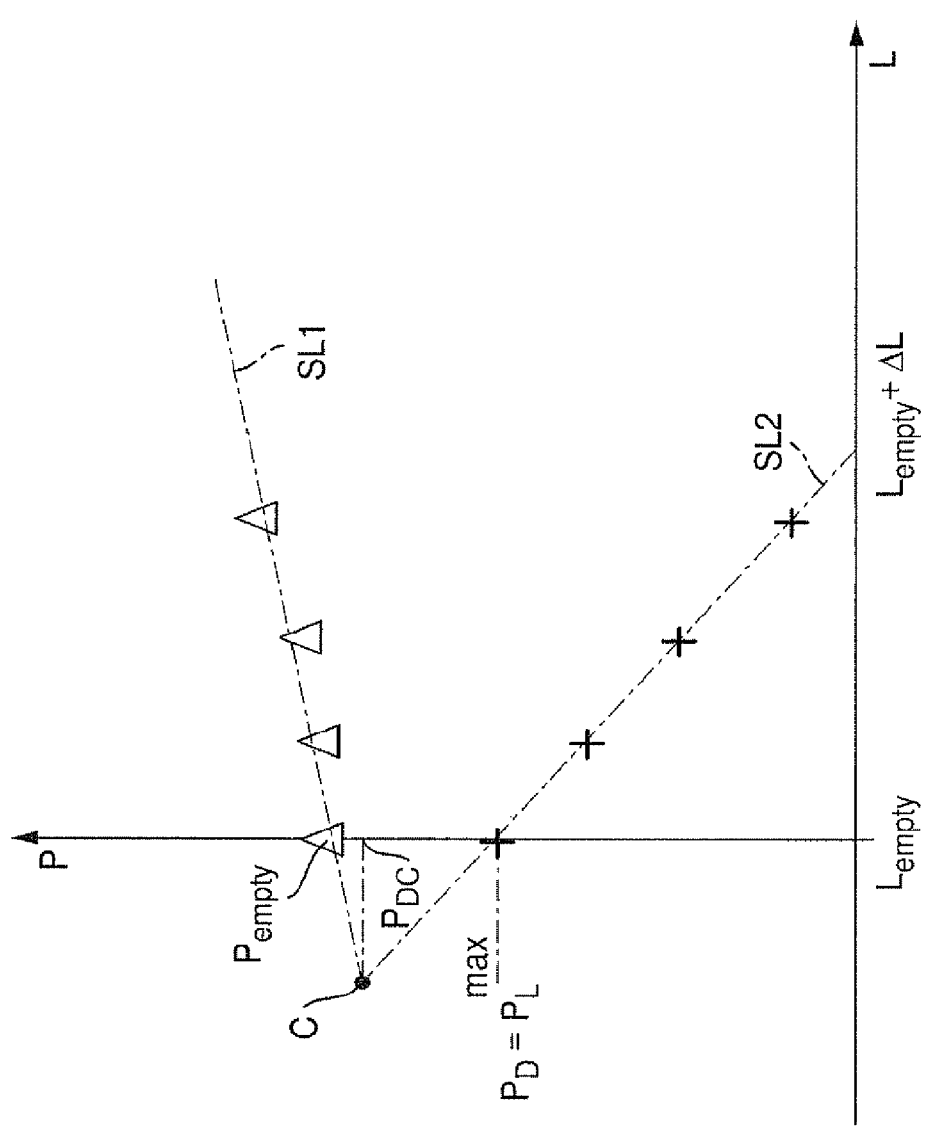
FIG. 4 is a fill level-and container floor echo positions ascertained with the measuring arrangement of FIG. 2, as a function of associated fill level.

FIG. 4 presents, by way of example, a graph obtained during this period of time with the measuring arrangement illustrated in FIG. 2. The graph shows, as a function of fill level L, fill level echo positions $P_L$ (the plus signs) and container floor echo positions PF (the triangles).

Subsequently, based on the recorded container floor echo positions PF and the associated fill levels L, a first regression straight line SL1 is determined from the container floor echo positions PF. Regression straight line SL1 shows the positions $PF^{SL1}$ of the container floor echoes $E_F$ as a function of fill level $L_i$. I.e.:

SL1: $PF^{SL1} = m\,L + PF_0$ wherein m is the slope and $PF_0$ the intercept of the line.

Application of this regression straight line SL1 is based on the assumption that the container floor echo position PF of the container floor echo $E_F$ rises linearly with rising fill level L. This assumption is regularly fulfilled, since this fill level-dependent rise depends on the fill level L dependent length of the path distance traveled by the microwave signals in the fill substance and the difference of the propagation velocities of the microwave signals in the medium located above the fill substance and in the fill substance.

If the empty distance position $P_D$ is only inaccurately known, in parallel thereto, preferably based on the recorded fill level echo positions $P_L$ and the associated fill levels L, a second regression straight line SL2 is determined from the fill level echo positions $P_L$, which gives the positions $P_L^{SL2}$ of the fill-level echo $E_L$ as a function of fill level L.

$$SL2: P_L^{SL2} = n L + P_{L0}$$

wherein n is the slope and $PL_0$ the intercept of the line.

An intersection C of the two regression straight lines SL1 and SL2 is determined, and its position subsequently used for identifying the fill level- and container floor echoes $E_L$, $E_F$ in the echo functions E(P) recorded in the period of time as a fictive empty distance position $P_{DC}$ separating the two ranges I and II from one another. Based on this fictive empty distance position $P_{DC}$, now also echoes E arisen in the period of time within the empty distance position range $\Delta P_D$ can be identified as fill level- or as container floor echo $E_L$, $E_F$.

In such case, the intersection C can already be determined relatively early within the period of time based on few measured fill level echo positions $P_L$ and few measured container floor echo positions PF. Based on the fill level echo positions $P_L$ recorded in the period of time, the greatest recorded fill level echo position $P_L^{max}$ is ascertained. The latter corresponds to the lowest fill level $L_{empty}$ arisen during the period of time. Via application of the fictive empty distance position $P_{DC}$, this is also assured, when the fill-level echo $E_L$ of the lowest arisen fill level L has occurred within the empty distance position range $\Delta P_D$. Since the container 1 was at least once emptied during the period of time, the lowest arisen fill level L lies at almost empty container 1.

Accordingly, the greatest registered fill level echo position $P_i^{max}$ corresponds at the same time also to the actually present empty distance position $P_D$. It is, consequently, preferably stored in the fill-level measuring device 3 and used in subsequent measurement operation instead of the earlier, possibly only with lesser measurement accuracy predetermined, empty distance position $P_D$ for echo identification.

The sought empty echo position $P_{empty}$ corresponds to the container floor echo position PF in the case of empty container 1, and results, thus, directly from the greatest recorded fill level echo position $P_L^{max}$ and the first regression straight line SL1 as that container floor echo position $PF^{SL1}$ ($L=L_{empty}$), which the regression straight line SL1 indicates as the fill level $L_{empty}$ associated with the greatest recorded fill level echo position $P_L^{max}$.

Following on the determining of the empty echo position $P_{empty}$, an empty echo position range $\Delta P_{empty}$ preferably narrowly limited on both sides around this empty echo position $P_{empty}$ is established, in which the container floor echo $E_F$ is to be expected in subsequent measurement operation in the case of empty container 1. In such case, the empty echo position range $\Delta P_{empty}$ must at least be as large as the accuracy of measurement of the position determination. However, it also does not need to be much larger. Preferably, a range is selected, whose width amounts to a preferably small, single digit multiple of the accuracy of measurement of the position determination.

Following on the setting of this empty echo position range $\Delta P_{empty}$, the method of the invention enables the presence of an empty container 1 to be reliably recognized and displayed.

In such case, an empty container 1 is only displayed, when in the respective current echo function E(P) no fill-level echo $E_L$ can be detected and a container floor echo $E_F$ is detected within the narrowly limited, empty echo position range $\Delta P_{empty}$.

If the container floor echo $E_F$ lies outside of the empty echo position range $\Delta P_{empty}$, then a fill level L is present lying above the height in the container 1 given by the empty distance D, even when no fill-level echo $E_L$ could be detected.

This case can arise from a large number of different reasons.

Thus, first of all, physical causes can be mentioned, which lead to the fact that the surface of the fill substance reflected back to the fill-level measuring device 3 only a fraction too small to register a measurement or even no fraction at all. That is, for example, the case, when the fill substance has in the region of the surface of the fill substance, in which the transmitted microwave signals T strike, at least for a short-time, a low dielectric constant and therewith a low reflectivity. Moreover, this case can be caused by turbulence on the surface of the fill substance, which leads to a situation in which microwave signals reflected on the turbulent surface of the fill substance are reflected in other spatial directions than back to the fill-level measuring device 3. Another cause for a non detectable fill-level echoe $E_L$ is foam formation on the surface of the fill substance, which leads to weak and/or diffuse reflections.

Along with that, a non detectable fill-level echo $E_L$ can, however, also have measuring method-specific causes. A example of this occurs in the above mentioned methods, wherein echoes of microwave reflecting disturbances, such as e.g. objects installed in the container 1, are masked out in the echo functions E(P), e.g. via predetermined echo thresholds,. These methods lead to the result that a fill-level echo $E_L$ of a fill level L located at the height of the disturbance is masked out in the same manner as the echo of the disturbance, and, thus, is not detected.

If, in measurement operation, no fill-level echo $E_L$ is detected, but, instead, only a container floor echo $E_F$ lying outside of the empty echo position range $\Delta P_{empty}$, then this is preferably displayed by the fill-level measuring device 3, for example, in the form of a report of fill level echo loss,.

Moreover, in these cases, the fill level L can be determined based on the container floor echo position PF of the detected floor echo $E_F$ exceeding the empty echo position $P_{empty}$ and an earlier ascertained dependence PF(L) of the container floor echo positions $E_F$ on the fill level L.

If the geometry of the container 1 and the location of installation of the fill-level measuring device 3 are known earlier, this dependence PF(L) can be determined by calculation based on the difference of the propagation velocities of the microwave signals in the medium located above the fill substance and in the fill substance and the fill level L dependent length of the path distance traveled in the fill substance by the signal components forming the container floor echo $E_F$.

Preferably, the dependence of the container floor echo positions $E_F$ on fill level L is, however, determined exactly as the empty echo position $P_{empty}$ by the fill-level measuring device 3 in a preferably automated method automatically at the location of use in the respective measuring arrangement. This offers for determining the dependence the above advantages already stated in connection with determining the empty echo position $P_{empty}$.

The determining of this dependence PF(L) occurs preferably by operating the fill-level measuring device 3 during a period of time in which the fill level L passes at least once through at least one portion of the fill level range, for which the dependence PF(L) should be determined. Exactly as in the case of determining the empty echo position $P_{empty}$, also here, during the period of time, echo functions E(P) are derived, and the container floor echo positions PF of the container floor echo $E_F$ detectable in the echo functions E(P) and the fill level echo positions PL of the fill-level echoes $E_L$ detectable in the echo functions E(P) are recorded as a function of the associated fill levels L, for example, based on the ascertained fill level echo positions $P_L$. Insofar, the method agrees with that of the empty echo position determination, and there results the recording shown in FIG. 4.

Also, here, again, the above described regression straight line SL1 can be determined from the container floor echo positions PF, in order to yield directly the sought dependence PF(L) of the container floor echo positions PF on fill level L.

In such case, it suffices when the determining of this dependence PF(L) is over a period of time, in which the fill level L passes through only a portion of the fill level range, for which the dependence is to be determined. The dependence PF(L) in the fill level regions not contained in the portion can then be determined by extrapolation of the dependence PF(L) ascertained for the portion. In this connection, the dependence PF(L) can be predetermined, for example, also in the fill level regions beyond the portion by means of the regression straight line SL1.

The invention claimed is:

1. A method for measuring a fill level of a fill substance in a container with a fill-level measuring device working according to the travel time principle in measuring arrangements, in which, in the case of an empty container, at least a part of microwave signals transmitted into the container is reflected back to the fill-level measuring device via a reflection on a floor of the container, comprising the steps of:
   transmitting microwave signals from the fill-level measuring device into the container
   receiving as received signals portions of the microwave signals that are reflected in the container back to the fill-level measuring device after a travel time dependent on a path distance of the microwave signals traveled in the container;
   deriving echo functions based on the received signals, which show amplitudes of the received signals as a function of a position that corresponds to the travel time of the microwave signals or the path distance of the microwave signals traveled in the container;
   detecting whether the echo functions, contain a fill-level echo attributable to a reflection on a surface of the fill substance and whether the echo functions contain a container-floor echo attributable to a reflection on the container floor; and
   indicating the presence of an empty container only when no fill-level echo was detected in the respective echo function, and, a container-floor echo was detected at a container-floor echo position in the respective echo function, said container-floor echo lying in an earlier determined empty-echo-position range of the echo function, said empty-echo-position range being bounded on both ends, said container-floor.

2. The method as claimed in claim 1, in the case of which the empty-echo-position is determined by the steps of:
   transmitting microwave signals from the fill-level measuring device into the container, and receiving back as received signals portions of the microwave signals that are reflected in the container back to the fill-level measuring device after a travel time dependent on a path distance of the microwave signals traveled inthe container, said transmitting and receiving occurring over a period of time in which the container is emptied at least once;
   deriving echo functions based on the received signals, which show amplitudes of the received signals as a function of a position corresponding to the travel time of the microwave signals or the path distance of the microwave signals traveled in the container;
   determining container-floor-echo positions of the container-floor echos on the basis of the echo functions, said container-floor echos being detectable in the echo functions, in the case where at least one container-floor echo is detected within said period of time; and
   setting the empty-echo position equal to the smallest container-floor-echo position determined in this period of time.

3. The method as claimed in claim 2, wherein:
an empty distance position range enclosing an empty distance position is predetermined, in which therein occurring echoes are identifiable neither as fill-level echoes nor as container floor echoes;
the empty distance position is that position, which corresponds to a distance from the fill-level measuring device, in which the microwave signals transmitted from the fill-level measuring device in the case of empty container first strike a portion of the container floor; the empty echo position range is set equal to the empty distance position range, when, during the period of time, no container floor echo was detected or the least container floor echo position arisen during the period of time borders directly on the empty distance position range;
the empty echo position range is set equal to an empty echo position surrounding range, whose width is greater than a position determination accuracy of the fill-level measuring device and less than a single digit multiple of the position determination accuracy, when the ascertained empty echo position exceeds the empty distance position range by more than the position determination accuracy; and
in subsequent regular measurement operation, echoes occurring within the empty echo position range are identified as container floor echoes.

4. The method as claimed in claim 2, wherein:
in the case of which the fill substance partially reflects microwave signals striking thereon and partially lets them pass through, the container floor echo positions in the echo functions are determined by: detecting a container floor echo in one of the echo functions derived during the period of time and determining its container floor echo position; and detecting the container floor echo of the echo functions derived timewise after this echo function, in each case, based on the respective echo function and the earlier last determined container floor echo position.

5. The method as claimed in claim 2, wherein:
during the period of time, in which, based on the echo functions recorded in the respective period of time, the empty distance position and/or the dependence of the container floor echo position on fill level is determined, fill level is measured by determining in the echo functions the fill level echo positions of the fill-level echoes detectable in the echo functions, and the associated fill levels are determined based on the fill level echo positions.

6. The method as claimed in claim 1, wherein:
in the case of which the fill substance partially reflects microwave signals striking thereon and partially lets them pass through, the empty echo position is determined by the steps of: the fill-level measuring device transmits, over a period of time, in which the fill level varies at least by a predetermined minimum amount and the container is emptied at least once, microwave signals into the container and receives back as received signals the portions of the microwave signal reflected in the container back to the fill-level measuring device after a travel time dependent the path distance of the microwave signals traveled in the container; based on the received signals, echo functions are derived, which show amplitudes of the received signals as a function of a position corresponding to the travel time of the microwave signals or the path distance of the microwave signals traveled in the container; based on the echo functions, fill level echo positions of the fill-level echoes detectable in the echo functions and container floor echo positions of the container floor echo detectable in the echo functions are determined and stored together with the, in each case, associated fill levels; the greatest fill level echo position detected during the period of time is determined, and the associated fill level kept as the lowest fill level arisen during the period of time; based on the stored container floor echo positions and the associated fill levels, a first regression line is determined, which shows the positions of the container floor echoes as a function of fill level; and the empty echo position is determined as that container floor echo position, which is present according to the regression line at the lowest arisen fill level.

7. The method as claimed in claim 6, wherein:

at the beginning of the period of time, an empty distance position range surrounding an empty distance position is predetermined, in which therein occurring echoes are identifiable neither as fill-level echoes nor as container floor echoes; an empty distance is a distance from the fill- level measuring device dependent on the installed height of the fill-level measuring device and the container form, in which distance microwave signals transmitted from the fill-level measuring device, and in the case of an empty container, first strike a portion of the container floor, and the empty distance position is the position within the echo functions corresponding to the empty distance, based on the recorded fill level echo positions and the associated fill levels, a second regression line is determined, which shows the positions of the fill-level echoes as a function of fill level; a virtual empty distance position is determined, which is equal to the position of an intersection of the two regression: straight lines; and echoes arisen within the period of time in the echo functions and also within the empty distance range are identified as fill-level echoes, when they occur at a position, which is less than the virtual empty distance position, and are identified as container floor echoes, when they occur at a position, which is greater than the virtual empty distance position.

8. The method as claimed in claim 7, wherein:

in the case of which, based on the greatest detected fill level echo position, an actually present empty distance and/or its actually present empty distance position are determined by setting the actually present empty distance position equal to the greatest fill level echo position detected in the period of time.

9. The method as claimed in claim 1, wherein:

in the case of which the fill substance thereon arising microwave signals partially reflected and partially through occur can be, and the fill level based on an earlier ascertained dependence the container floor echo positions on fill level and the position of the floor echo is determined, when; no fill-level echo was detected in the echo function; and the floor echo position of the detected floor echo lies outside of the empty echo position range.

10. The method as claimed in claim 9, wherein:

in the case of which the dependence of the container floor echo position on fill level is predetermined by the steps of: the fill-level measuring device, over a period of time, in which the fill level varies by at least one predetermined minimum amount, transmits microwave signals into the container and received back as received signals the portions of the microwave signal reflected in the container back to the fill-level measuring device after a travel time dependent on the path distance of the microwave signals traveled in the container; based on the received signals, echo functions are derived, which show amplitudes of the received signals as a function of a position corresponding to the travel time of the microwave signals or the path distance of the microwave signals traveled in the container; based on the echo functions, container floor echo positions of the container floor echoes detectable in the echo functions are determined and stored together with the, in each case, associated fill levels; and based on the recorded container floor echo positions and the associated fill levels, a regression line is determined, which shows dependence of the container floor echo position on fill level.

\* \* \* \* \*